US005678035A

United States Patent [19]

Takebe

[11] Patent Number: 5,678,035

[45] Date of Patent: Oct. 14, 1997

[54] IMAGE DATA MEMORY CONTROL UNIT

[75] Inventor: Makoto Takebe, Hiratsuka, Japan

[73] Assignee: Komatsu Ltd., Japan

[21] Appl. No.: 588,630

[22] Filed: Jan. 19, 1996

[30] Foreign Application Priority Data

Jan. 20, 1995 [JP] Japan .................................... 7-007458

[51] Int. Cl.[6] .................................................... G06F 12/06

[52] U.S. Cl. ........................... 395/518; 395/516; 395/510; 345/187; 345/200; 365/230.05

[58] Field of Search .................................... 395/518, 516, 395/510, 509, 501; 345/200, 189, 187, 197; 365/230.05, 230.03, 230.01

[56] References Cited

U.S. PATENT DOCUMENTS 4,980,765 12/1990 Kudo et al. ............................. 345/203
5,319,603 6/1994 Watanable et al. ................ 365/230.05

FOREIGN PATENT DOCUMENTS 6202616 7/1994 Japan .

*Primary Examiner*—Kee M. Tung
*Attorney, Agent, or Firm*—Greer, Burns & Crain, Ltd.

[57] ABSTRACT

An image data memory control unit for storing the image data of a plurality of planes in a multiport video memory including a memory component having a random port for reading and writing data therethrough in response to input address signals and a register component having a serial port for outputting data that have been stored in the memory component serially in sequence from the lower address in synchronicity with input clock signals, comprises an image processor for outputting address signals in which the most significant bit portion is a plane recognition bit portion that recognizes the plurality of planes, and for outputting the image data of the plurality of planes therethrough to the multiport video memory in response to the address signals; and address conversion unit for converting the address signals output from the image processor so that the plane recognition bit portion is moved to the least significant bit portion, and the remaining bits are shifted to higher significant bits following the least significant bit portion.

5 Claims, 8 Drawing Sheets

IMAGE DATA MEMORY CONTROL UNIT

BACKGROUND OF THE INVENTION

1. Field of the Invention

The present invention relates to an improved system of storing image data for a multiport video memory used for a display memory.

2. Description of the Related Art

A device referred to as a multiport video RAM, as depicted in FIG. 10, has recently been attracting attention for display memory.

The multiport video RAM comprises a RAM component 100 constructed of an ordinary DRAM memory cell and a SAM component 110 constructed of a data register. The RAM component 100 and the SAM component 110 have separate ports. The RAM component 100 and SAM component 110 can be operated nonsynchronously in completely independent fashion. As such, the random port side of the RAM component 100 is used to read and write image processor data, and the serial port side of the SAM component 110 is used for the display of a display device such as a CRT. Since these operations can be managed in completely independent fashion, more efficient video memory can be realized.

The RAM component 100 in the multiport video RAM has an address port through which data are read and written by means of address signals while the SAM component 110 is synchronized with a predetermined clock signal, not address signals and the data are sequentially output from the lower address. That is, counter operations involving sequentially incremented clock signals are executed in the SAM component 110, and data are read out in sequence from the lower address according to the count signals. In the multiport video RAM, data are transported in units of a specified number of bits (1024 bits, for example) from the RAM component 100 to the SAM component 110.

Conventionally, there are plane type and packed pixel type methods for storing image data in a display memory.

FIG. 11 shows a plane type in which a display memory is configured so that the information in one word is 16 bits of information on a single memory plane.

FIG. 12 shows a packed pixel type in which a display memory is configured so that the information in one word is one or several pixels of information.

Image processing is easier with the plane type in which the data in the same plane are located in continuous addresses, than with the packed pixel type, and the plane type is consequently used more frequently.

However, because the addresses for the data of each plane are far apart when the plane type storage method is applied to the multiport video RAM depicted in FIG. 10, it is necessary to set up one multiport video RAM for each plane in order to read out the data of each plane in parallel in a short period of time per one word unit or one byte unit. That is, even when the data of several planes are stored in a single multiport video RAM, the manner of output from the serial port of the multiport video RAM is sequentially read out from the lower address according to the clock signals, making it impossible for the data of the several planes to be read out in a short period of time per one word unit or one byte unit.

With recent increases in the capacity of video RAM, it has become possible to store the image data of several planes in a single video RAM, at least as far as memory capacity is concerned, and there is a need for a storage method that would allow video RAM having such a greater capacity to be used more effectively.

SUMMARY OF THE INVENTION

In view of the foregoing, it is an object of the present invention to provide an image data memory control unit which would allow images to be processed using plane type memory and which would allow the image data of a plurality of planes stored in a single multiport video memory to be output virtually simultaneously in units of a prescribed number of bits.

In the present invention, an image data memory control unit for storing the image data of a plurality of planes in a multiport video memory including a memory component having a random port for reading and writing data therethrough in response to input address signals, and a register component having a serial port for outputting data that have been stored in the memory component serially in sequence from the lower address in synchronicity with input clock signals, comprises an image processor for outputting address signals in which the most significant bit portion is a plane recognition bit portion that recognizes the plurality of planes, and for outputting the image data of the plurality of planes therethrough to the multiport video memory in response to the address signals; and address conversion means for converting the address signals output from the image processor so that the plane recognition bit portion is moved to the least significant bit portion, and the remaining bits are shifted to higher significant bits following the least significant bit portion.

According to the present invention, the image data of a plurality of planes are stored together in the multiport video memory in a prescribed sequence in units of a prescribed number of bits by means of a prescribed address conversion, allowing the image data of this plurality of planes to be output virtually simultaneously in units of a prescribed number of bits, and allowing the image data of the plurality of planes to be stored in a single multiport video memory. As a result, multiport video memory can be used effectively, and since the multiport video memory is controlled by an image processor using the same plane types as in the past, existing software can be used without modification.

DESCRIPTION OF THE PREFERRED EMBODIMENTS

The present invention is described in detail below with reference to preferred embodiments illustrated in the appended drawings.

Figure 1:
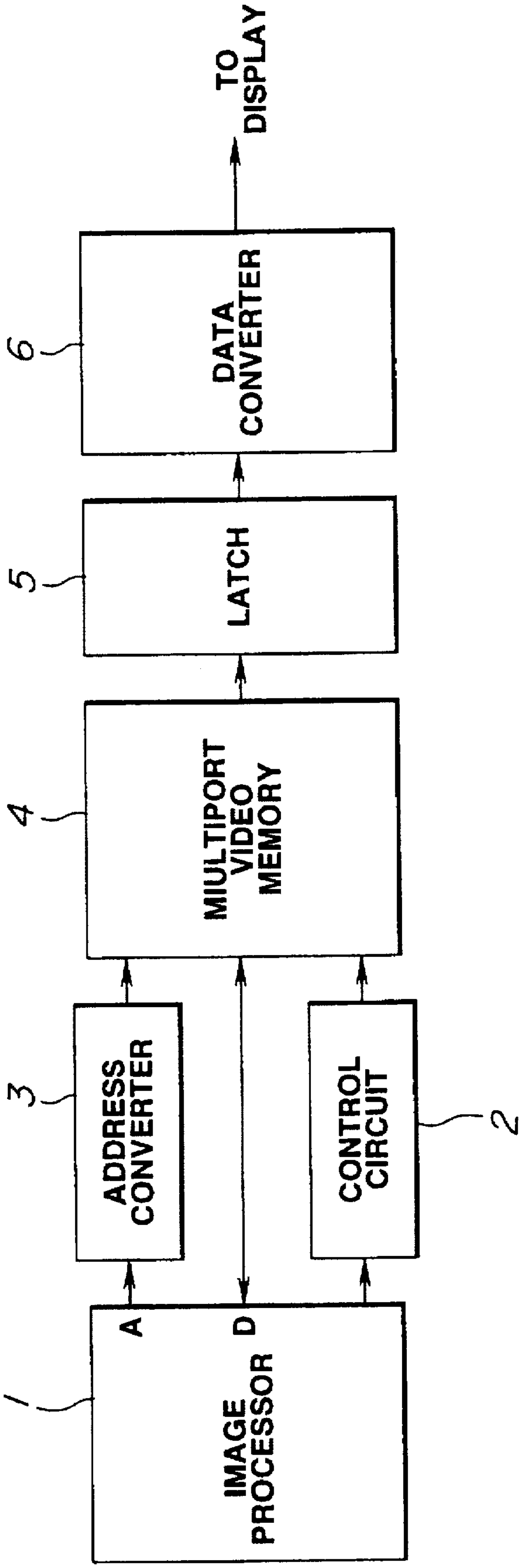
FIG. 1 is a block diagram illustrating an embodiment of an image date memory control unit according to the present invention.

FIG. 1 illustrates an embodiment of the present invention. This assumes a case in which 16-color display is executed with four planes R, G, B, and S of image data.

Figure 11:
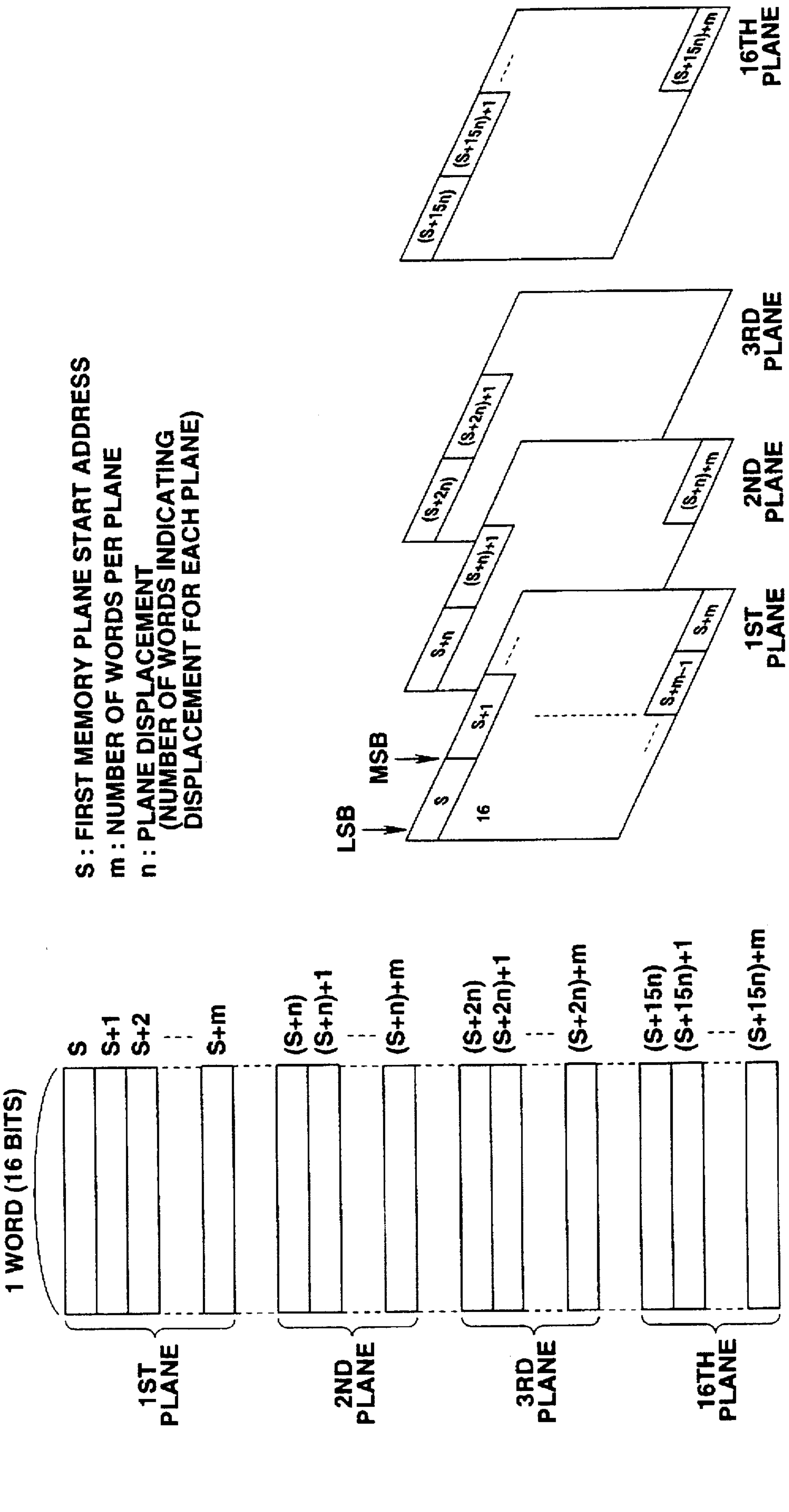
FIG.11 PRIOR ART
FIG. 11 illustrates a plane type storage.
Figure 12:
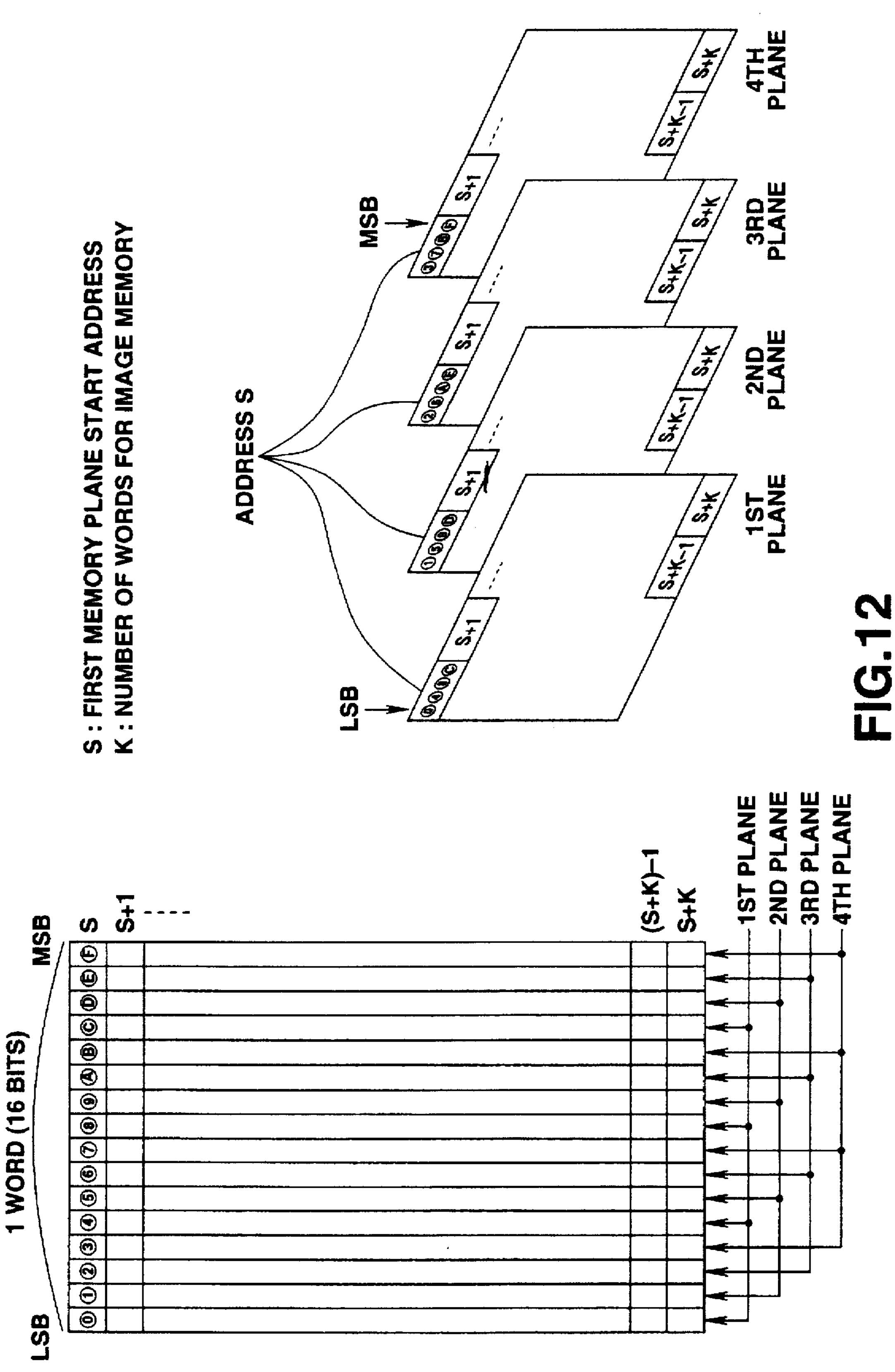
FIG.12 PRIOR ART
FIG. 12 illustrates a packed pixel type storage.

An image processor 1 is used to control the display based on raster scanning. Control signals such as horizontal and vertical synchronizing signals are output to a control circuit 2, and the four planes of image data are input via an input-output terminal D to a multiport video memory 4. Address signals A0 through An are output via an address terminal A to an address converter 3. In this case, the image processor 1 controls data input and output to the multiport video memory 4 based on the fact that the four planes of image data are stored in the plane type illustrated in FIG. 11 above.

Figure 2:
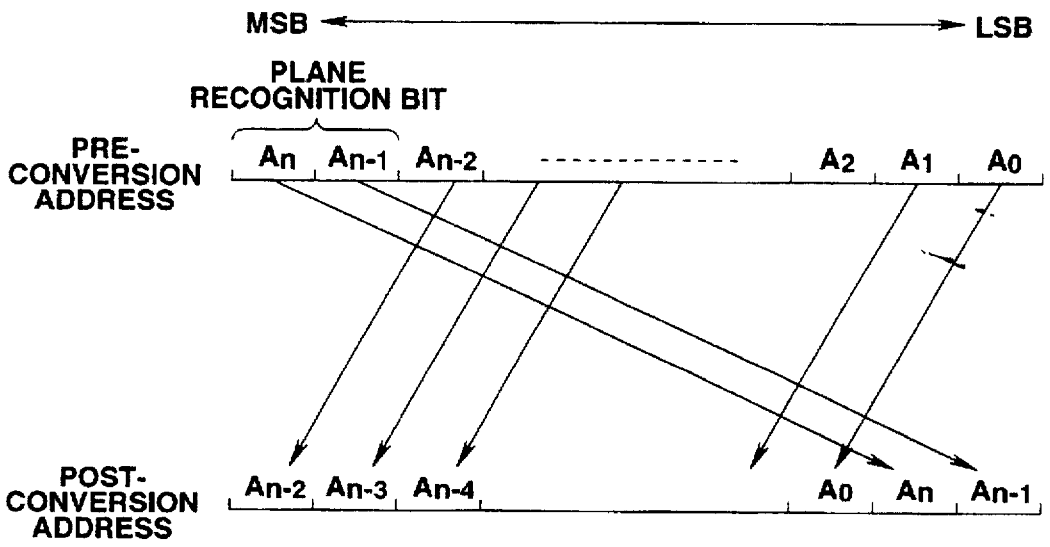
FIG. 2 illustrates the particulars of address conversion.

The address converter 3 executes the address conversion, of the address signals A0 through An input from the image processor 1, in the configuration depicted in FIG. 2, and inputs the address signals following the address conversion to the address terminal of the multiport video memory 4. This address conversion is described in greater detail below.

The control circuit 2 controls the input and output of the image data in the video memory 4 based on control signals such as horizontal or vertical synchronizing signals input from the image processor 1 so that the desired display is achieved on a connected display not shown in the figure.

Figure 10:
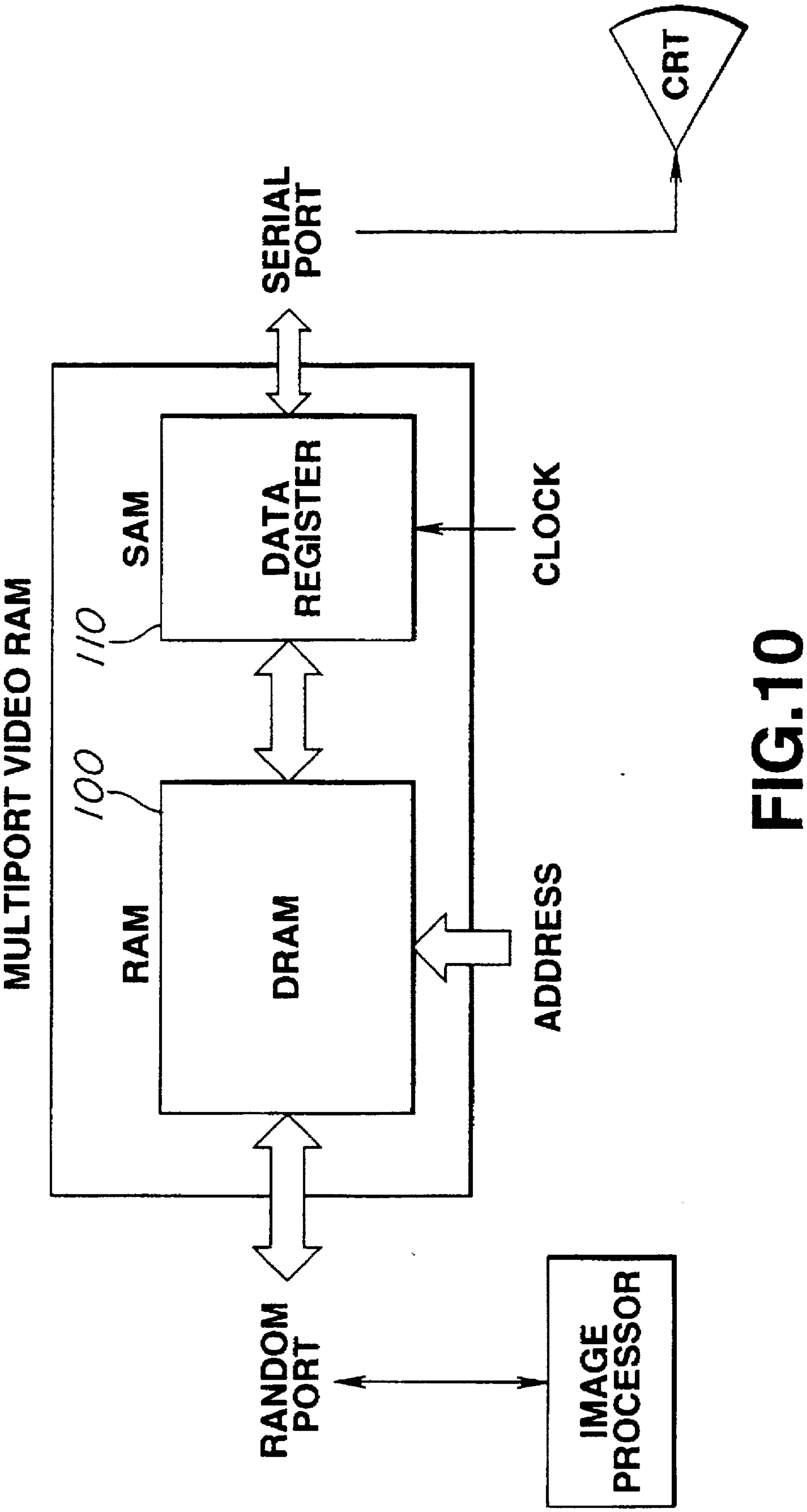
FIG. 10 illustrates a multiport video RAM.

The multiport video memory 4 has a memory component 100 with a random access port and a register component 110 with a serial port, as shown in FIG. 10 above. In this case, the memory component 100 has the capacity to allow at least four planes of image data to be stored.

The multiport video memory 4 involves the three following primary operations.

(1) Data Read/Write Operations Between Image Processor 3 Via Random Port

Data are read and written for designated addresses in the same manner as access for ordinary dynamic memory.

(2) Data Transmission Operations From Memory Component 100 to Register Component 110

Data of a specified number of words are transmitted from a designated address.

(3) Serial Data Output From Register Component 110

Data accumulated in the register component are output sequentially in synchronicity with input clock signals.

A latch 5 temporarily latches the four planes of image data input via the serial port of the multiport video memory 4, and this output is supplied to a data conversion circuit 6. In the data conversion circuit 6, the number of bits of input image data is apportioned two or four bits at a time and is transmitted, so that it can be output to a display, or color processing is executed to combine the four planes of image data into pixels, or the like, and the output is supplied to a display.

The address conversion executed by the address converter 3 is described in detail below. The following address conversion is executed by the address converter 3 only during the read/write operation (1) among the three operations of the multiport video memory 4 described above. No address conversion is executed during the operations (2) and (3).

Figure 3:
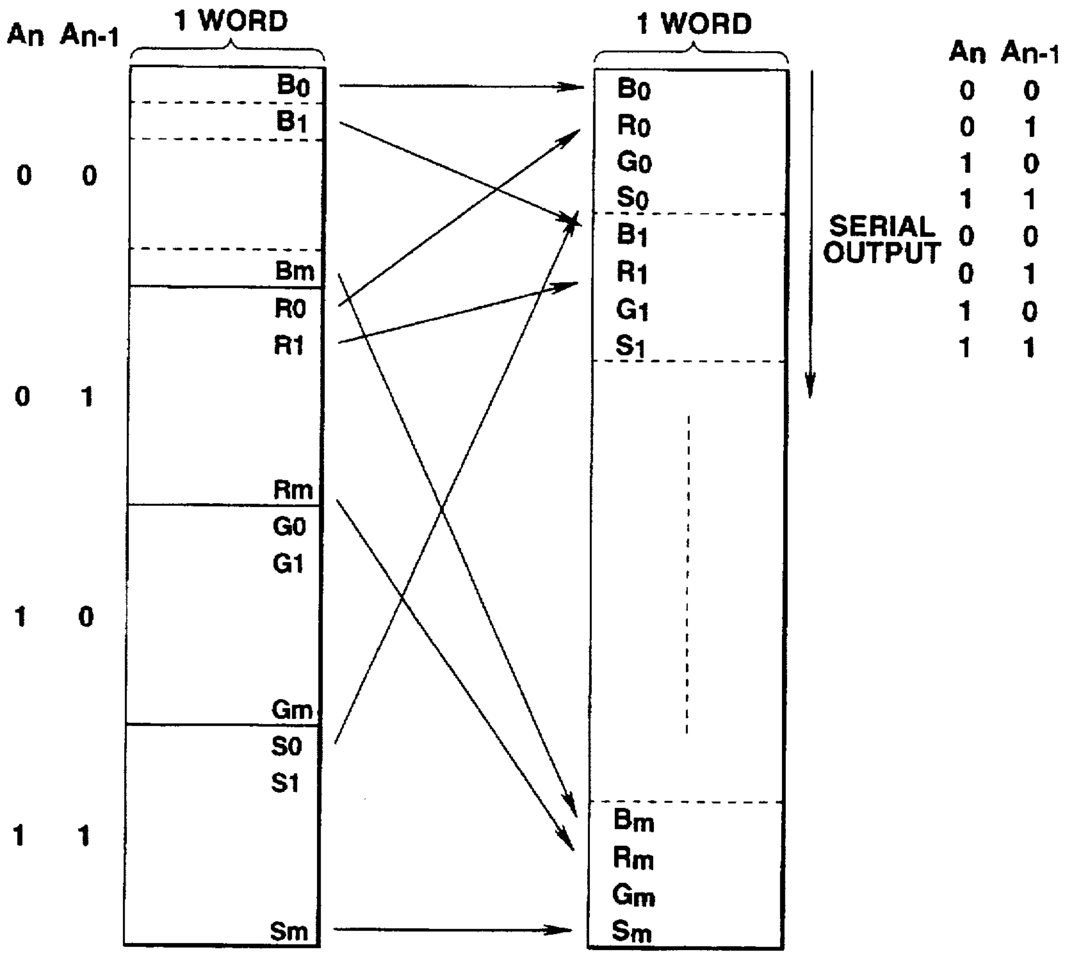
FIG. 3 illustrates the particulars of storage before and after address conversion.

First, as shown in FIG. 2, where the pre-conversion address signals output from address terminal A in the image processor 1 are A0 through An totaling to n+1 bits, the most significant two bits An and An−1 are plane recognition bits for recognizing the four planes R, G, B and S. With the remaining address bits A0 through An−2, the data of each plane are apportioned into one word (or one byte). As a result of such pre-address conversion plane type address designation, the four planes of image data are stored in one well-defined region for each plane, as shown in the left portion of FIG. 3. In FIG. 3, when one word is 16 bits, 16-pixel image data are stored as binary data in one word storage regions. Thus, address signals An through A0, where the two most significant bits An and An−1 serve as plane recognition bits for recognizing the four planes R, G, B, and S, are input from the image processor 1 to the address converter 3.

In the address converter 3, the address signals An through A0 input from the image processor 1 undergo address conversion in the configuration shown in FIG. 2, and these post-address conversion address signals are input to the multiport video memory 4.

That is, in the address converter, as shown in FIG. 2, plane recognition bits composed of the two most significant bits An and An−1 among the address signal A0 through An input from the image processor 1 are moved to the least significant two bits, and the remaining address bits A0 through An−2 are shifted to the next least significant bit portions following these two least significant bits.

This address conversion allows the four planes of image data to be actually recorded in the configuration shown in the right portion of FIG. 3, that is, a configuration in which the four planes of image data are combined in one word units, in the memory component 100 of the multiport video memory 4.

The four planes of image data stored in the configuration shown in FIG. 3 in the memory component 100 are transmitted in sequence in increments of the prescribed number of words from the lead address to the register component 110 by means of the transfer operations from the memory component 100 to the register component 110. The image data transmitted to the register component 110 are then output one word at a time in sequence from the head address in synchronicity with the prescribed clock signals.

The address conversion described above allows the four planes of image data to be stored while combined in one word units, as shown in the right portion of FIG. 3, in the memory component 100 of the multiport video memory 4, thereby allowing the image data of the plurality of planes to be stored in a single multiport video memory 4, and allowing the image data of this plurality of planes to be output virtually simultaneously in one word units.

Figure 4:
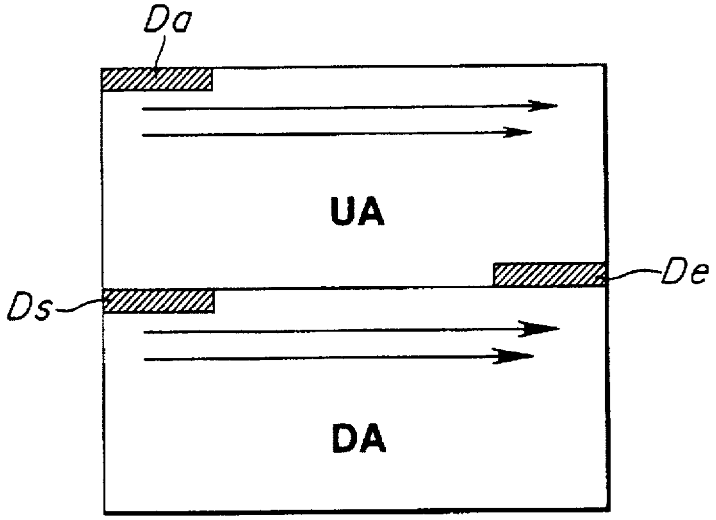
FIG. 4 illustrates a display screen divided into upper and lower halves for double scanning.

Next, as shown in FIG. 4, the present invention can be adapted to double scanning methods to enhance screen brightness, where the display is divided into an upper area UA and lower area DA. That is, when a CRT controller is used to drive a flat display such as EL or liquid crystal, or when the screen is a large screen, the brightness of the screen is diminished unless raster scanning is executed at a speed twice that of the CRT display, so double scanning methods are applied, where single scanning signals are developed into double scanning signals and output to the display.

Figure 5:
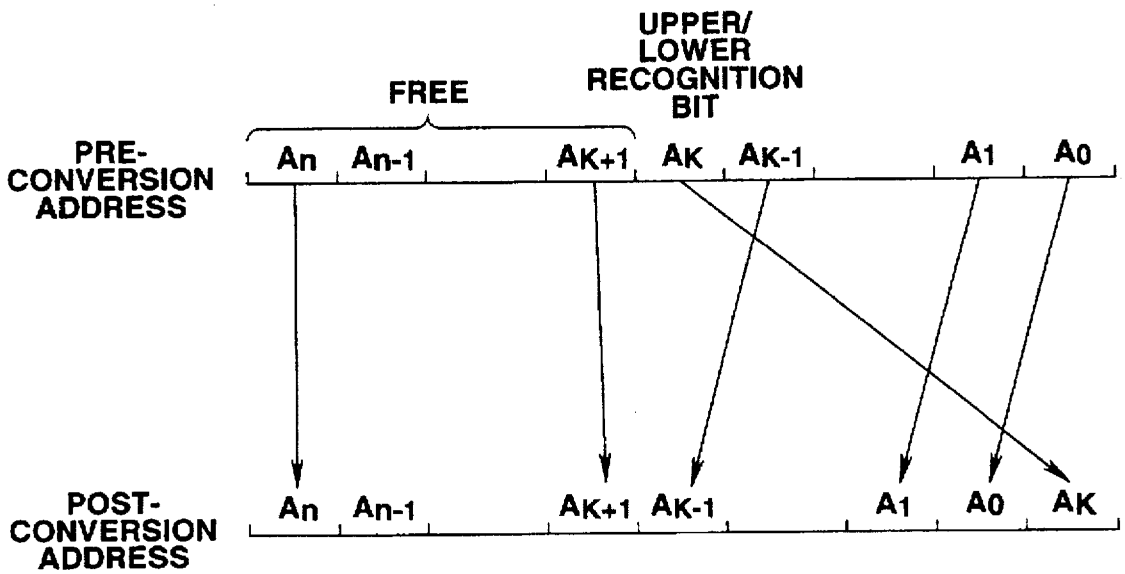
FIG. 5 illustrates the particulars of address conversion when image data for double scanning are stored.

When the present invention is adapted to such double scanning type monochrome display, the address conversion depicted in FIG. 5 should be executed by the address converter 3. Naturally, in the case of monochrome display, only a single plane of image data is output from the image processor 1.

That is, in such cases, where Ak represents an upper/lower area recognition bit for recognizing data of the upper area UA and lower area DA among the address signals An through A0 output from the image processor 1 (Ak+1 through An are free bits), the upper/lower area recognition bit Ak which is essentially in the most significant position is moved to the least significant position bit, and the remaining address bits A0 through Ak−1 are shifted to the next least significant bit portions following this lowest bit.

Figure 6:
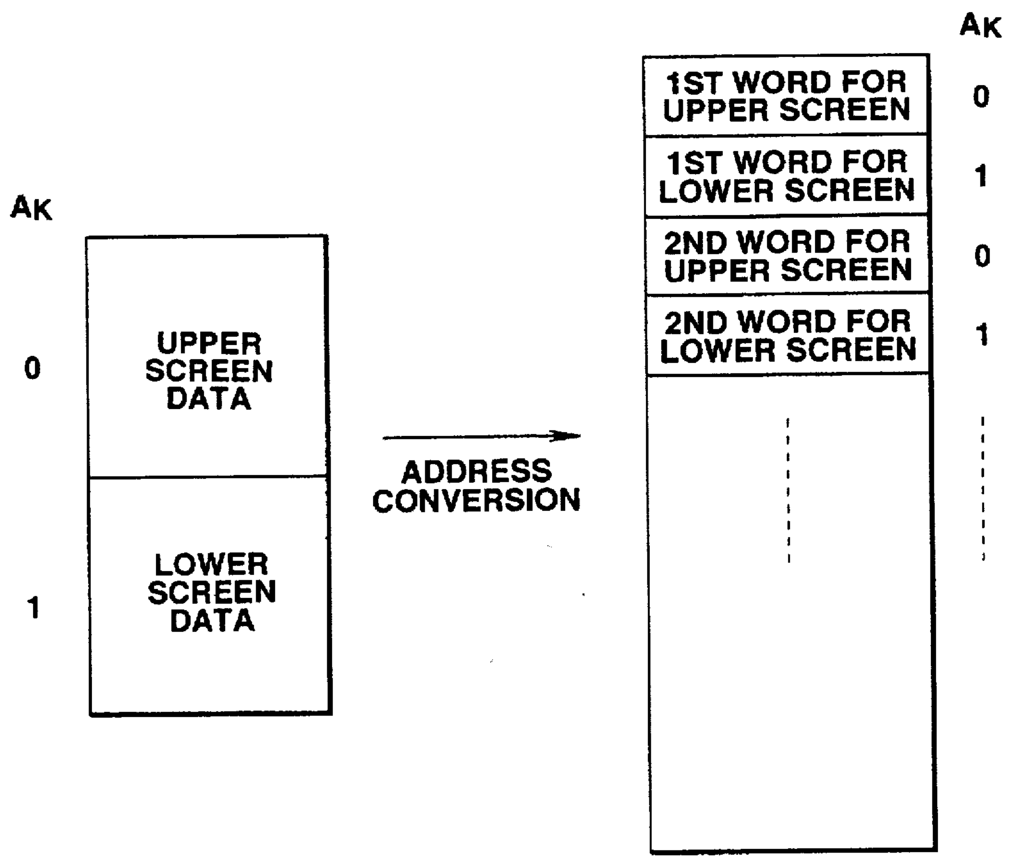
FIG. 6 illustrates the particulars of video memory storage based on the address conversion shown in FIG. 5.

This address conversion allows the upper screen image data and lower screen image data to be alternately stored in one word units, as shown in FIG. 6, in the video memory 4, thus allowing double scanning upper screen data and lower screen data to be stored in one multiport video memory 4, and allowing these upper screen image data and lower screen image data to be output virtually simultaneously in one word units.

In determining the storage address for the multiport video memory 4, the storage start address of the multiport video memory 4 corresponding to the lead word Da of the upper area UA is determined in such a way that the address for the final word De in the upper area UA depicted in FIG. 4 is Ak through A0=0111 . . . 1 while the address for the lead word Ds in the lower area DA is Ak through A0=1000 . . . 0, and the data in each word from the start address are stored continuously. This address method allows the upper and lower areas to be recognized by the Ak bit, irrespective of the number of pixels that are to be displayed, and allows double scanning image data to be stored in a continuous address region.

The present invention also can be adapted to double scanning methods in color image display using a plurality of planes. Examples of address conversion for this case are depicted in FIGS. 7 and 9.

Figure 7:
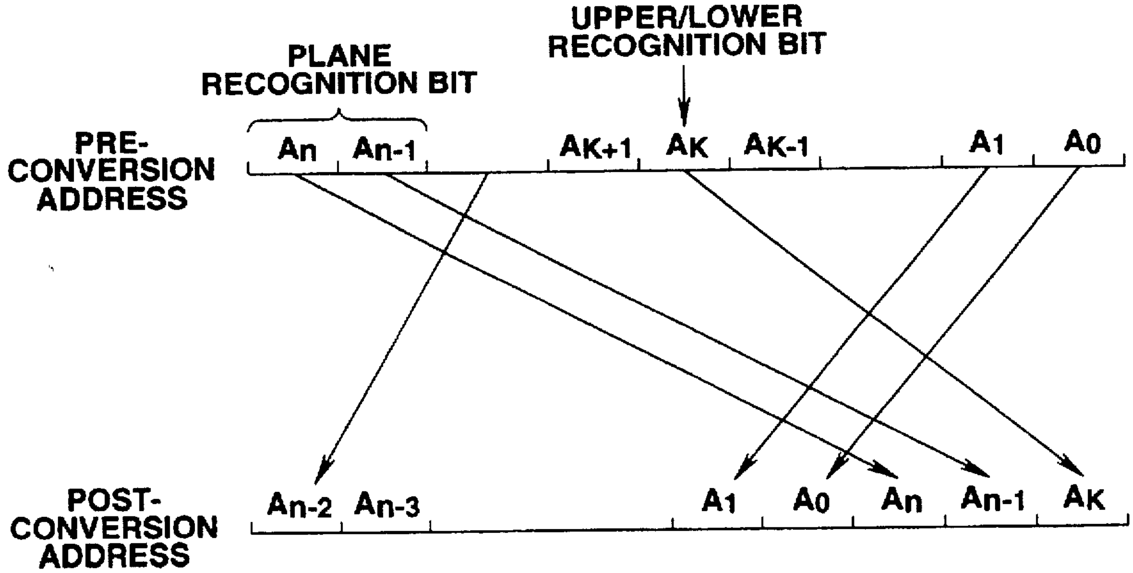
FIG. 7 illustrates the particulars of address conversion for when color image data for double scanning are stored.

FIG. 7 is of a case involving four planes. In this case, the upper and lower area recognition bit Ak from among the address signals An through A0 output from the image processor 1 is moved to the least significant position bit, the plane recognition bits composed of the two most significant bits An and An−1 are moved to the next two least significant bits following the least significant position bit, and the remaining address bits A0 through Ak−1 and Ak+1 through An−2 are shifted to the next least significant bit portions following the least significant three bits just described.

Figure 8:
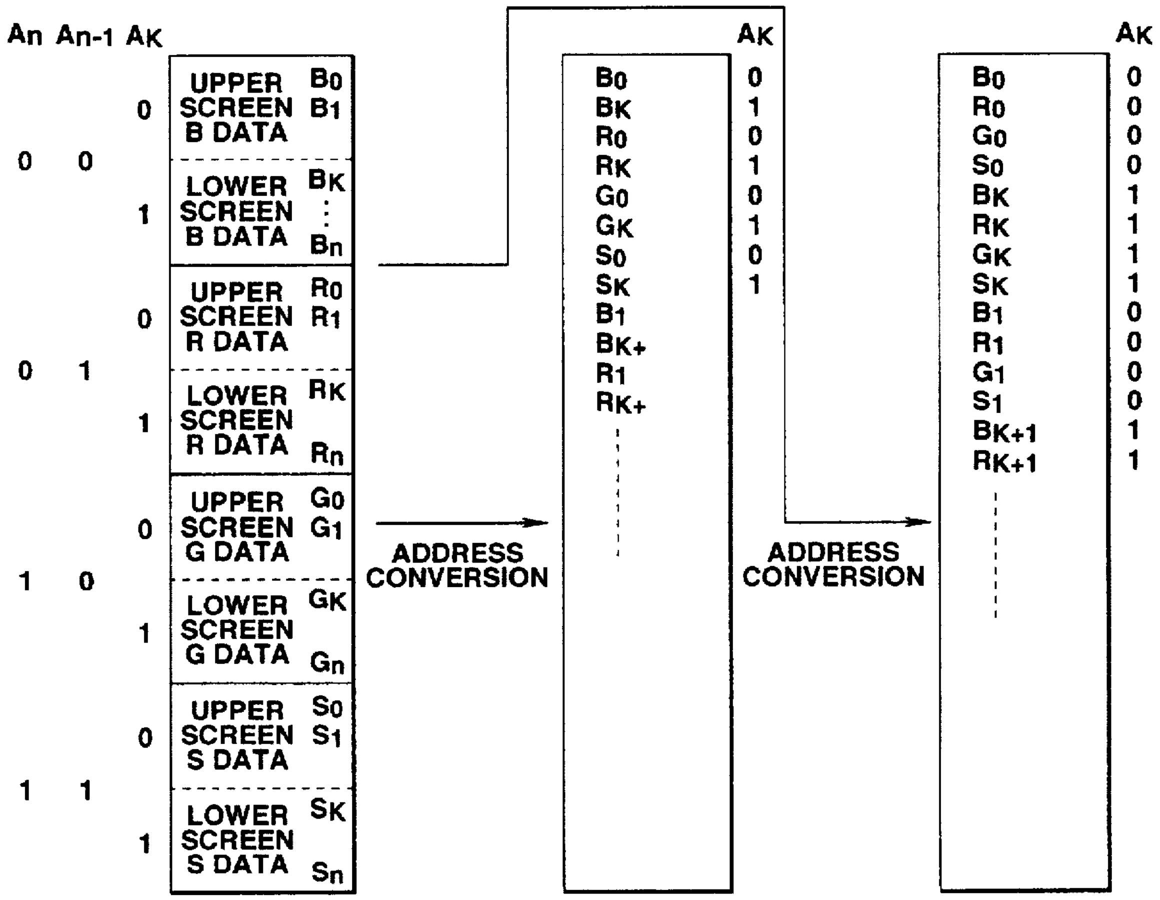
FIG. 8 illustrates the particulars of video memory stored by the address conversion shown in FIGS. 7 and 9.

This address conversion allows the four planes of upper screen and lower screen image data to be stored together in one word units, as shown in the left and center portions of FIG. 8, in the video memory 4, thus allowing the multiple planes of upper screen data and lower screen data for double scanning to be stored in a single multiport video memory 4, while also allowing the multiple planes of upper screen data and lower screen data to be output virtually simultaneously in one word units.

Figure 9:
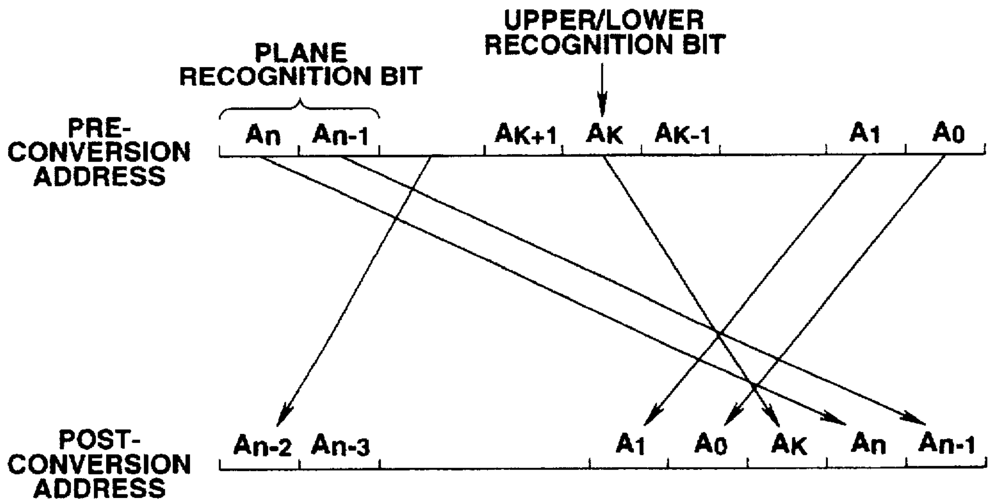
FIG. 9 illustrates another example of the particulars of address conversion when color image data for double scanning are stored.

FIG. 9 is a variant of FIG. 7. In this case, the plane recognition bits composed of the two most significant bits An and An−1 from among the address signals An through A0 output from the image processor 1 are moved to the two least significant position bits, the upper/lower area recognition bit Ak is moved to the next least significant bit following these two least significant position bits, and the remaining address bits A0 through Ak−1 and Ak+1 through An−2 are shifted to the next least significant bit portions following the least significant three bits just described.

This address conversion allows the four planes of upper screen and lower screen image data to be stored together in four word units, as shown in the left and right portions of FIG. 8, in the video memory 4, thus allowing the multiple planes of upper screen data and lower screen data for double scanning to be stored in a single multiport video memory 4, while also allowing the multiple planes of upper screen data and lower screen data to be output virtually simultaneously in one word units.

In the embodiments described above, the present invention was applied for the storage of multiple planes of image data or the storage of double scanning image data, but the present invention can also be applied to any other storage method in which image data is stored in differing data areas.

In these cases as well, as in the embodiments described above, the address conversion should be executed so that the recognition addresses for recognizing a data area are moved to the lowest address portions in the multiport video memory 4, and the address bit portions other than these recognition addresses are shifted to the next lowest addresses following these lowest addresses.

What is claimed is:

1. An image data memory control unit for storing the image data of a plurality of planes in a multiport video memory including a memory component having a random port for reading and writing data therethrough in response to input address signals, and a register component having a serial port for outputting data that have been stored in the memory component serially in sequence from the lower address in synchronicity with input clock signals, wherein the image data memory control unit comprises:

an image processor for outputting address signals in which the most significant bit portion is a plane recognition bit portion that recognizes the plurality of planes, and for outputting the image data of the plurality of planes therethrough to the multiport video memory in response to the address signals; and address conversion means for converting the address signals output from the image processor so that the plane recognition bit portion is moved to the least significant bit portion, and the remaining bits are shifted to higher significant bits following the least significant bit portion.

2. An image data memory control unit for storing image data of double scanning display regions which are divided into upper and lower halves, in a multiport video memory including a memory component having a random port for reading and writing data therethrough in response to input address signals, and a register component having a serial port for outputting data therethrough that have been stored in the memory component serially in sequence from the lower address in synchronicity with input clock signals, wherein the image data memory control unit comprises:

an image processor for outputting address signals in which the most significant bit is an upper/lower recognition bit that recognizes whether the image data are in the upper or lower region, and for outputting the double scanning image data to the multiport video memory in response to the address signals; and address conversion means for converting the address signals output from the image processor so that the upper/lower recognition bit is moved to the least significant bit, and the remaining bits are shifted to higher significant bits following the least significant bit.

3. An image data memory control unit for storing image data of double scanning display regions which are divided into upper and lower halves, for a plurality of planes in a multiport video memory including a memory component having a random port for reading and writing data therethrough in response to input address signals, and a register component having a serial port for outputting data therethrough that have been stored in the memory component serially in sequence from the lower address in synchronicity with input clock signals, wherein the image data memory control unit comprises:

an image processor for outputting address signals in which the most significant bit portion is a plane recognition bit portion that recognizes a plurality of planes while an upper/lower recognition bit that recognizes whether the image data are in the upper or lower region is in a position lower than the plane recognition bit portion, and for outputting the double scanning image data for a plurality of planes to the multiport video memory in response to the address signals; and address conversion means for converting the address signals output from the image processor so that the upper/lower recognition bit is moved to the least significant bit, the plane recognition bit portion is moved to a higher bit portion following the least significant bit, and the remaining bits are shifted to higher bits following the plane recognition bit portions.

4. An image data memory control unit for storing image data of double scanning display regions which are divided into upper and lower halves, for a plurality of planes in a multiport video memory including a memory component having a random port for reading and writing data therethrough in response to input address signals, and a register component having a serial port in which data that have been stored in the memory component are output serially in sequence from the lower address in synchronicity with input clock signals, wherein the image data memory control unit comprises:

an image processor for outputting address signals in which the most significant bit portion is a plane recognition bit portion that recognizes a plurality of planes while an upper/lower recognition bit that recognizes whether the image data are in the upper or lower region is in a position lower than the plane recognition bit portion, and for outputting the double scanning image data for a plurality of planes to the multiport video memory in response to the address signals; and address conversion means for converting the address signals output from the image processor so that the plane recognition bit portion is moved to the least significant bit, the upper/lower recognition bit is moved to a higher bit portion following the least significant bit, and the remaining bits are shifted to higher bits following the upper/lower recognition bit.

5. An image data memory control unit for storing image data in a multiport video memory including a memory component having a random port for reading and writing data therethrough in response to input address signals, and a register component having a serial port for outputting data that have been stored in the memory component serially in sequence from the lower address in synchronicity with input clock signals, wherein the image data memory control unit comprises:

first data arrangement conversion means for moving a recognition address that recognizes a data area to a lowest address of the multiport video memory; and second data arrangement conversion means for shifting address bit portions other than the recognition addresses to higher addresses following the lowest address.

* * * * *